Jan. 24, 1961 H. W. COOK 2,969,232
MACHINE FOR FOLDING NEWSPAPERS
Filed July 9, 1957 5 Sheets-Sheet 1

Inventor:
Henry W. Cook
By Horton, Davis, Brewer & Brugman
Attys.

Jan. 24, 1961  H. W. COOK  2,969,232
MACHINE FOR FOLDING NEWSPAPERS
Filed July 9, 1957  5 Sheets-Sheet 3
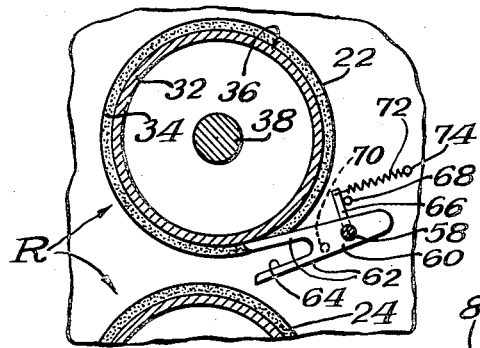
Fig. 3.
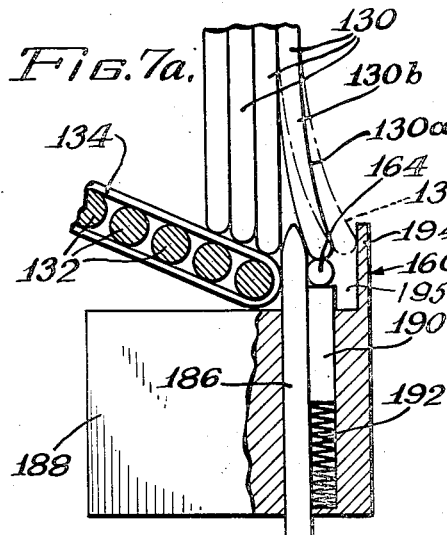
Fig. 7a.
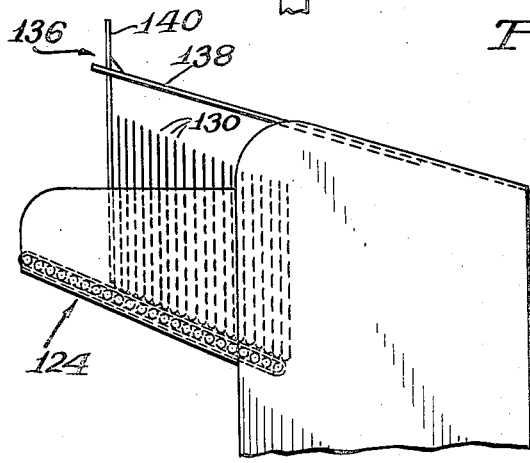
Fig. 6.
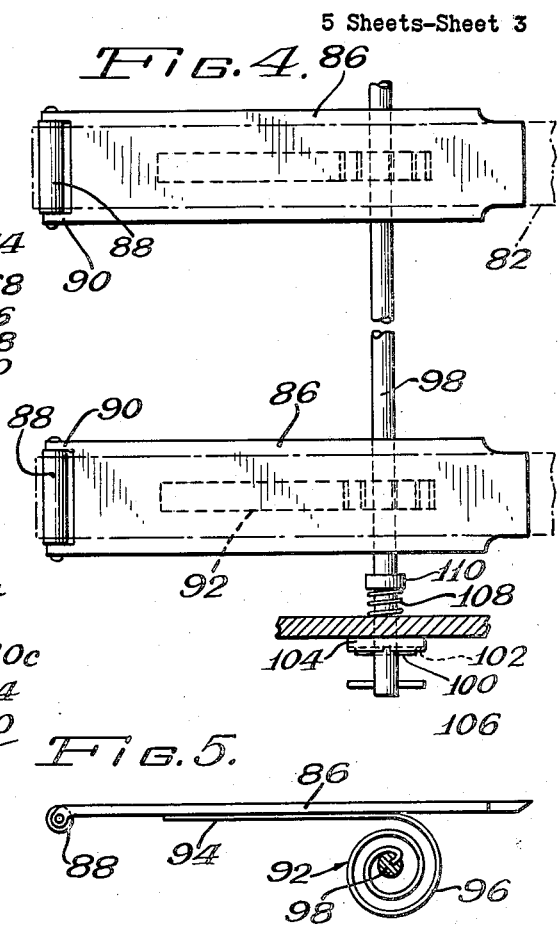
Fig. 4.
Fig. 5.
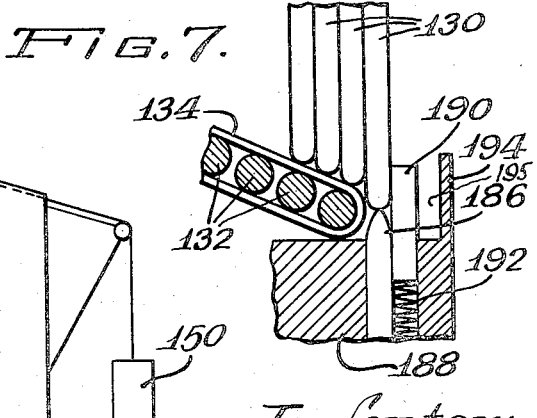
Fig. 7.
Inventor:
Henry W. Cook
By Hinton, Davis, Brewer & Brugman
Attys.

Jan. 24, 1961 H. W. COOK 2,969,232
MACHINE FOR FOLDING NEWSPAPERS
Filed July 9, 1957 5 Sheets-Sheet 4
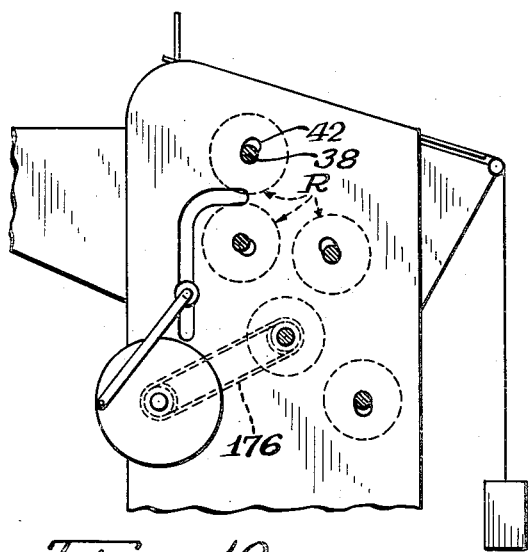
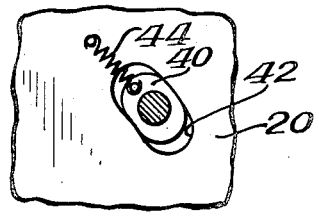
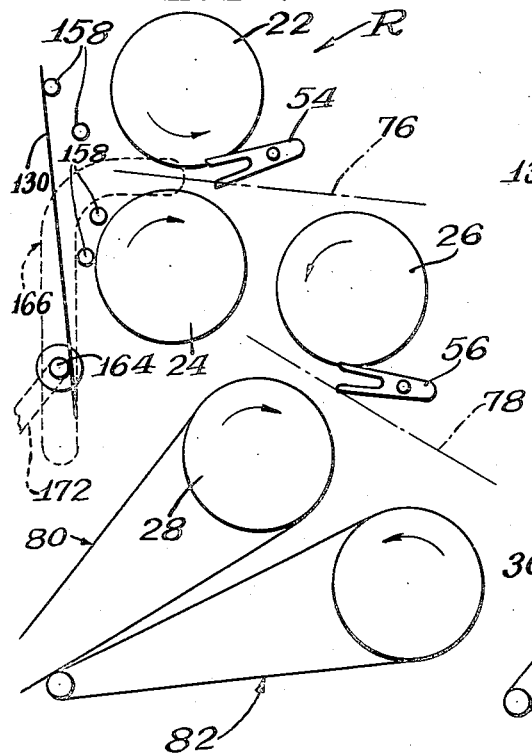
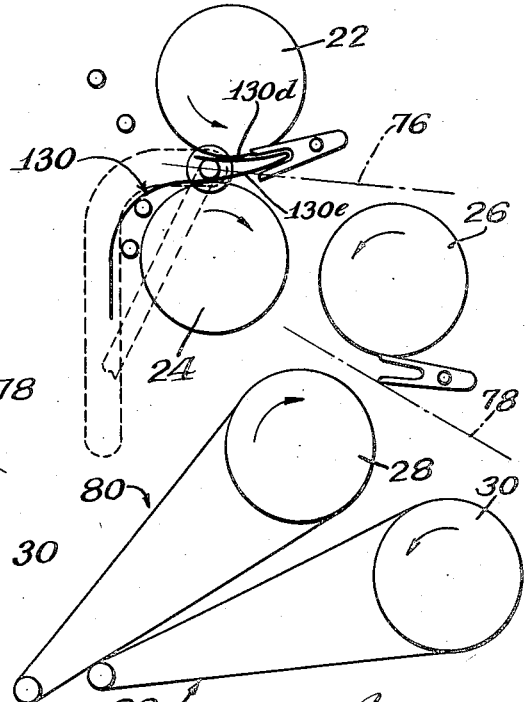
Inventor:
Henry W. Cook
By Horton, Davis, Brewer & Brugman
Attys.

Jan. 24, 1961 H. W. COOK 2,969,232
MACHINE FOR FOLDING NEWSPAPERS
Filed July 9, 1957 5 Sheets-Sheet 5
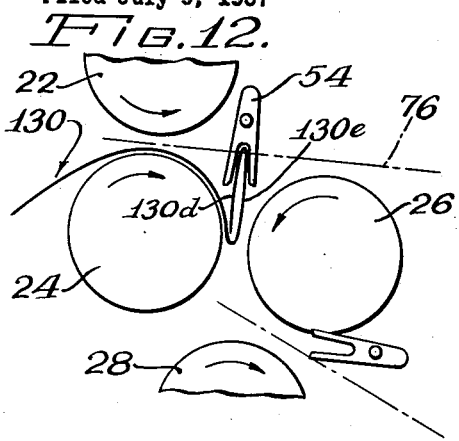
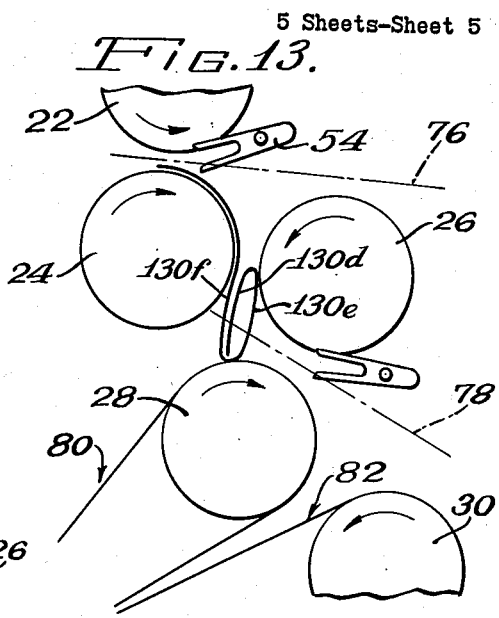
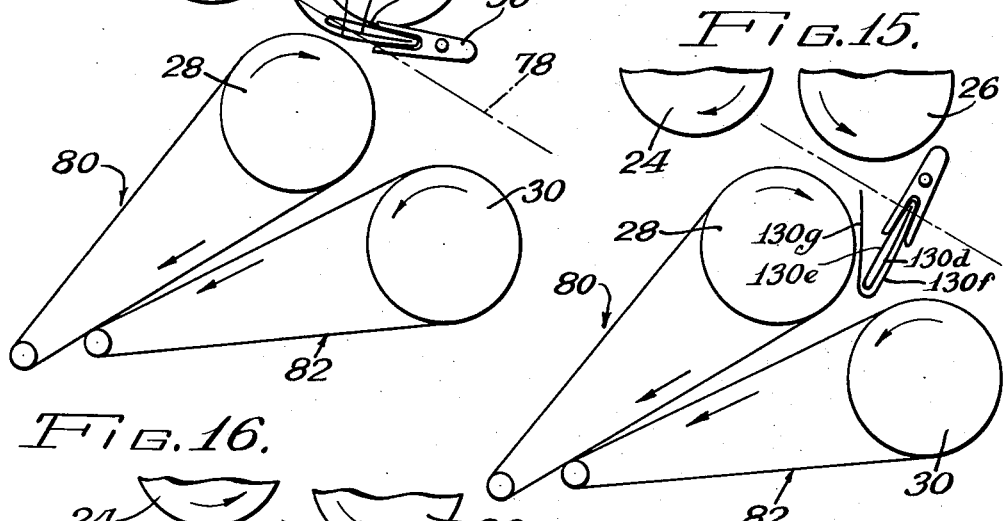
Inventor:
Henry W. Cook
By Horton, Davis, Brewer + Bruguera
Attys.

United States Patent Office 2,969,232
Patented Jan. 24, 1961

2,969,232

MACHINE FOR FOLDING NEWSPAPERS

Henry W. Cook, 4025 Amelia Ave., Lyons, Ill.

Filed July 9, 1957, Ser. No. 670,823

6 Claims. (Cl. 270—68)

The present invention relates to a machine for folding papers, and more particularly for folding newspapers.

The invention has to do with folding newspapers into small packets suitable for door-to-door delivery purposes. For such delivery, the newspaper is normally folded in a tight bundle and locked so that it can be easily thrown to the door from the sidewalk. The newspapers when distributed to the delivery boy or the station from which he obtains his allotment are ordinarily in flat condition, or as they would appear on the newsstand, and they are folded into the tight bundle mentioned from that flat condition. Such folding is quite time consuming when done by hand, and the machines heretofore provided for the purpose have not been entirely satisfactory.

An object therefore of the present invention is to provide a machine of novel construction and operation for folding newspapers for delivery purposes of the kind mentioned.

Another object is to provide a machine of the general character noted which is of unusually simple construction and which folds the newspapers accurately without the requirement for precision in the parts of the machine, either in their making or in their operation.

Another object has to do with the construction involving rolls for feeding the papers through the machine in the folding operation; the paper is folded several times, and for effecting each fold, the paper is passed through a set of rolls and it is necessary to change the direction of travel of the paper from one set of rolls to the next; the machine of the present invention includes novel arrangement of rolls and means for effecting the change in direction of the movement of the paper between folds.

Additional objects are to provide a folding machine which may be easily adapted to a presently known tying machine; and to novel means for feeding the papers from a stack or hopper into the machine.

Other objects and advantages of the invention will appear from the following detail description taken in conjunction with the accompanying drawings in which:

Fig. 3 is a sectional view of a portion of the roll means and folding finger taken approximately on the line 3—3 of Fig. 2;

Fig. 4 is a plan view of belt supporting and stiffener means;

Fig. 5 is a side elevational view of the belt supporting and stiffener means of Fig. 4;

Fig. 6 is a diagrammatic view of the upper portion of the machine, oriented according to Fig. 1 and showing the paper follower means in operative position;

Fig. 7 is a fragmentary view of a portion of the means for singly removing the papers from the stack in the hopper;

Fig. 7a is a view similar to Fig. 7, but with certain elements in different positions;

Fig. 8 is a view oriented according to Fig. 1 with certain elements removed, and showing the slots in the side frame of the machine permitting spreading and return movement of the rolls;

Fig. 9 is a fragmentary view showing one form of bearing means for supporting the rolls of Fig. 8; and Figs. 10 to 16, inclusive, are diagrammatic views showing the progress of the paper being folded in its passage through the machine.

Figure 1:
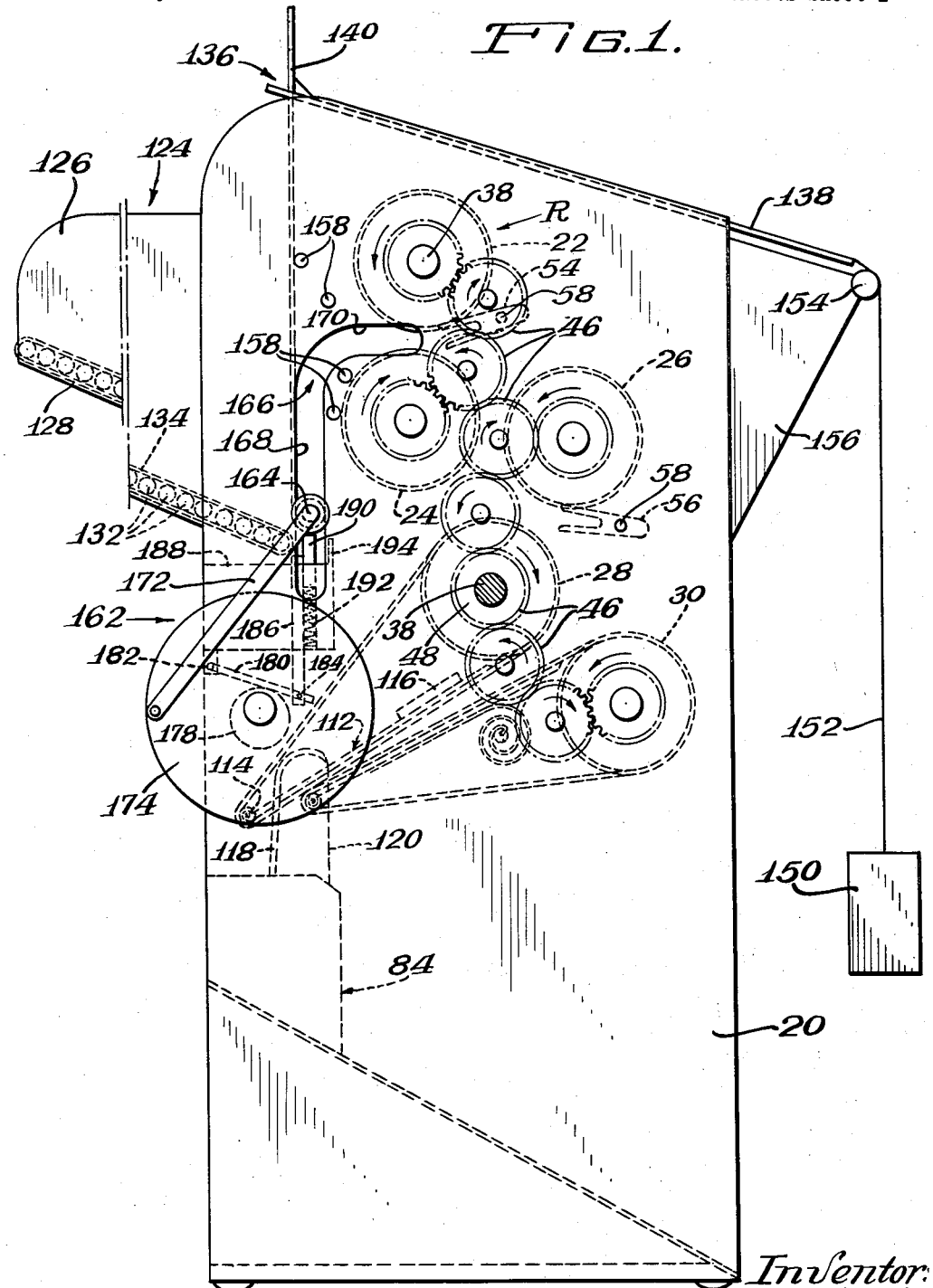
Figure 1 is a side elevational view of the machine embodying the principles of the present invention.
Figure 2:
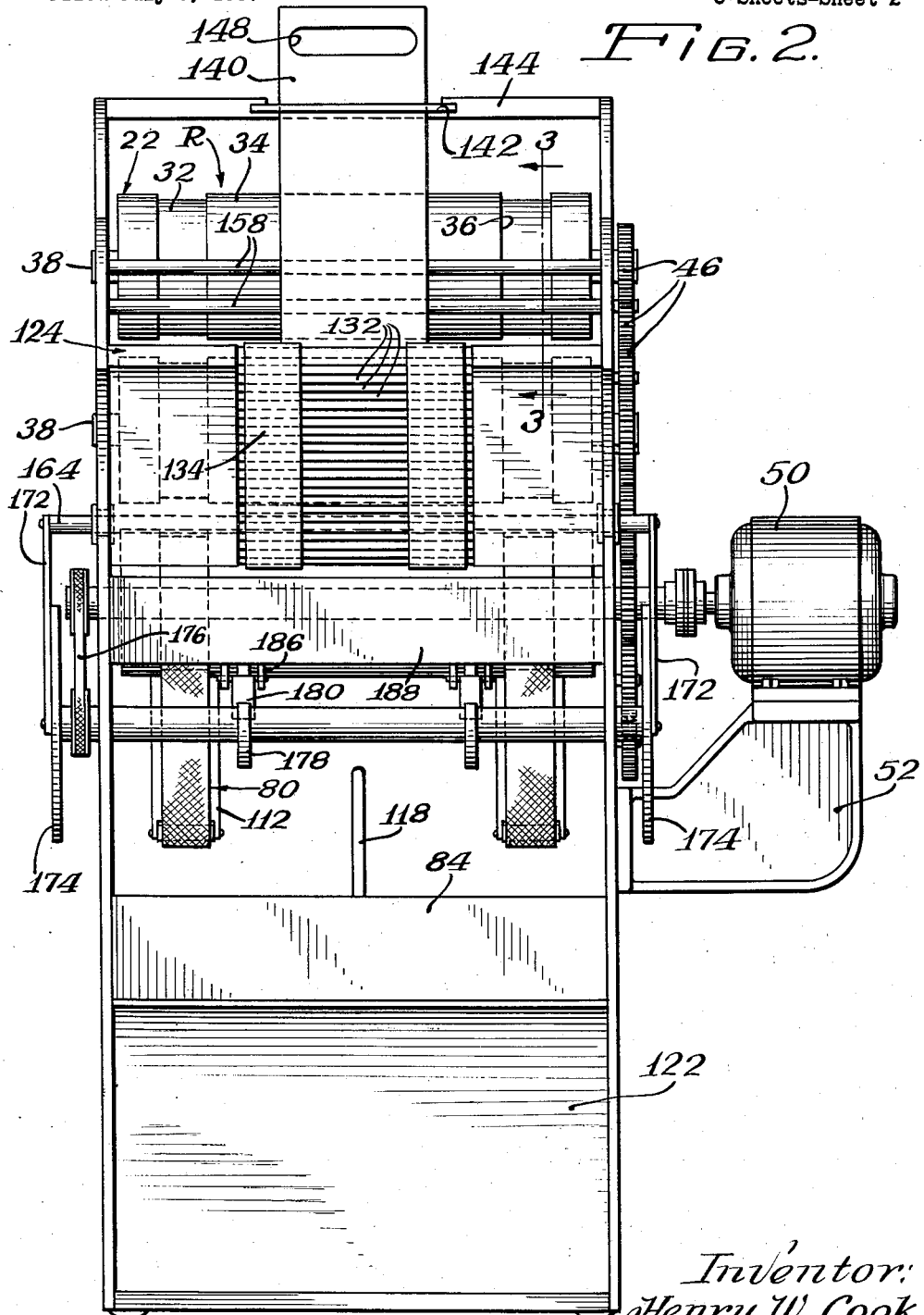
Fig. 2 is a front view of the machine.

Referring now in detail to the drawings, attention is directed first to Figs. 1 and 2 showing the machine as a whole. The machine includes spaced side plates 20, preferably extending the full height of the machine, and such other structural elements as are necessary to support the operating parts, as will be referred to hereinbelow. The spaced side plates 20 are both shown in Fig. 2, while in Fig. 1 the plate on the right side is shown, oriented according to the user who in loading the machine would be at the left thereof, as viewed in Fig. 1. Mounted in the side plates are a plurality of rolls indicated in their entirety by the letter R and designated individually by the numerals 22, 24, 26, 28, and 30, respectively. These rolls are all of similar construction, and as illustrated in Fig. 3, each includes a base or core cylinder 32 made of suitable material such as aluminum, and a plurality of coating elements 34 of resilient gripping material, preferably sponge rubber. These coating elements 34 are spaced axially along the roll to define a pair of grooves 36, one adjacent each end of the roll, and having a floor defined by the uncovered surface of the cylinder 32. The coating material 34 may be secured to the cylinder member 32 in any suitable and known manner. Each roll includes a shaft 38 having end portions mounted in the side plates 20 by suitable bearing means. The rolls are mounted for limited spreading and contracting movement as indicated in Figs. 8 and 9, and for this purpose the end portions of the shaft 38 may be mounted in suitable bearing means 40 which are slidably disposed in slots 42 in the side frames 20. The rolls assume normal positions as indicated in Fig. 8, and are biased to such positions by any suitable resilient means such as springs 44 which are only diagrammatic illustrations of suitable biasing means, as will be understood by those skilled in the art. Fig. 9 indicates one of the rolls in an intermediate position, a position assumed in a folding operation in which the roll moves from its normal position to its opposite position. The rolls move to the opposite ends of the respective slots 42 (Fig. 8) in response to the paper being folded passing between the respective rolls of a pair in a manned explained hereinbelow.

The rolls are rotated in the direction indicated by the arrows thereon, and are driven by gears 46, meshing together in a chain of gearing for driving all of the rolls and deriving their drive from a driving gear 48 mounted on the shaft 38 of the roll 28. The direction of rotation of the gears 46 is indicated by arrows thereon, for driving the rolls in their indicated directions, as will be understood. The gears 46 may be mounted by any suitable means either inwardly of the adjacent side plate 20 or outwardly thereof and in the latter case they may be covered by a suitable protector and decorative cover (not shown) as desired. The gears on the rolls are, of course, mounted on the respective shafts 38 while the remaining gears may be mounted on appropriate stub shafts mounted in the side plate 20.

The drive for the gear 28 may be provided by any suitable means such as an electric motor 50 mounted as on a platform 52 mounted on the side of the machine. Suitable drive connection is provided for imparting the drive from the motor to the shaft of the roll 28.

The rolls are adapted for gripping a newspaper and folding it and passing it from one set of rolls to another, as will be explained more fully hereinbelow. For use in the folding operation, novel folding fingers 54 and 56 are provided. Each of these fingers preferably includes two separate finger elements spaced apart axially along the rolls and mounted on a common shaft 58. The shafts are rockably mounted in the side plates 20 of the machine for limited rocking movement of the fingers. Each of the fingers is generally similar to a clothespin having a shank portion 60 (Fig. 3) and forked elements 62 defining a recess 64 therebetween. The limit of rocking movement of the fingers is indicated in Figs. 10 to 16 and described more fully hereinbelow. To limit the rocking movement, means such as a finger 66 (Fig. 3) may be mounted on the shaft 58 and engageable with the stop pins 68 and 70 suitably mounted in the machine such as on one of the side plates 20. Biasing means such as a tension spring 72 may be connected between the swinging end of the finger 66 and a fixed pin 74 mounted in the side frame. The spring 72 biases the folding finger 60 in clockwise direction, to a normal position shown in Figs. 3 and 10, in which it is limited by engagement between the finger 66 and the stop pin 68. In the folding operation the folding fingers are rocked to a discharging position as indicated in Figs. 12 and 15, respectively. They are moved to such discharging positions by the action of the paper being folded passing through the machine, and are limited in their movement to such discharging position by engagement between the finger 66 and the stop pin 70 (Fig. 3).

The axes of the shafts 58 for the folding fingers 54 and 56 are disposed at predetermined positions relative to the associated rolls as follows: the line 76 indicates a plane between the first two rolls, 22 and 24, perpendicular to the plane containing the axes of these two rolls. This plane 76 indicates the direction of passage of the paper between these two rolls, at least in the initial portion of the passage of the paper therebetween. The axis of the shaft 58 mounting the folding finger 54 is disposed on the side of the plane 76 opposite the rolls 24 and 26, the latter constituting a pair for receiving the paper from the folding finger.

Similarly a plane 78 is indicated between the rolls 26 and 28 perpendicular to a plane containing the axes of these two rolls. The axis of the shaft 58 mounting the folding finger 56 is disposed on the side of the plane 78 opposite the rolls 28 and 30 which receive the paper from the folding finger 56. The action of the various parts in this respect will be described more fully hereinbelow.

The finger elements of the finger 54 are disposed in register with the grooves 36 in the rolls 22, 24, and 26, and the extended ends of the forked portions 62 are adapted to extend into the grooves, at least in the normal position of the finger (Fig. 3). As will be noted from Fig. 3, one of the forked elements 62 extends into the groove in the roll 22 and may substantially engage the surface of the cylinder element 32. The limit position of the finger in this position is determined primarily by the stop pin 68, but the forked element 62 possesses a limited degree of resiliency and may spring into engagement slightly with the surface of the cylinder element 32 of the grooves. This condition may exist in the case of both the rolls 22 and 24, although the forked elements 62 may extend into respective grooves at a slightly different angle. The inner surfaces of the forked element 62 merge into the outer surfaces of the resilient members 34 so that there is no abrupt shoulder to be engaged by the paper entering into the recess 64, these two surfaces forming an effectively continuous surface for movement of the paper from the surface of the rolls 22 and 24, while being gripped therebetween, into the recess 64. The length of the folding finger 54 is such that the extreme ends of the forked elements 62 clear the cylinder element 32 of the roll 24. In the discharging position of the finger 54 (Fig. 12) the adjacent forked element 62 may be moved to various distances depending on the thickness of the paper, etc., and limited by the pin 70 and may move near or into the groove in the roll 26 to form somewhat continuous surfaces between the inner surface of the adjacent forked element 62 and the adjacent outer surface of the gripping portion 34 of the roll 26, whereby to facilitate gripping of the paper leaving the folding finger 54 by the roll 26.

The folding finger 56 may project slightly into the groove of the roll 26 when the finger is in its normal position (Fig. 14). However, in the discharging position of the finger, it does not enter into the grooves in the rolls 28 and 30 because the grooves in the latter rolls are occupied by belts 80 and 82, respectively. These belts are positioned for receiving the paper from the folding finger 56 and delivering it to a tying device indicated in its entirety at 84, and described more fully hereinbelow.

Each of the belts 80 and 82 includes a pair of belt elements spaced axially along the respective roll. Referring first to the belt 82, each belt element is supported by a belt supporting and stiffener means 86 shown in detail in Figs. 4 and 5. The belt stiffener may be an element such as a board, strip of metal, etc., disposed under and engaging the upper run of the belt. In the lower end of each of the boards, i.e., in the end thereof remote from the roll 30, is a small diameter roller 88 suitably mounted therein for free rotation as, for example, in extensions 90 formed on the end of the board. This roller serves as a belt tightener for the belt 82, the belt being trained over the roll 30 and the roller 88. These belt stiffeners are resiliently mounted in place by means of springs 92, each of which includes an elongated portion 94 extending a substantial portion of the length of the stiffener and secured thereto. The portion 94 forms an extension of a coil portion 96, the inner end of which is secured in a slot or groove in a transverse shaft 98 which is mounted at its ends in the side plates 20 of the machine. The tension of the spring 92 serves to retain the extended ends of the stiffeners containing the rolls 88 upwardly, and hence the belt 82 upwardly, into proximity to or engagement with the upper belt 80. The coil portion 96 is disposed adjacent the roll 30 for effecting the result just mentioned.

Means is provided for adjusting the tension of the springs 92 as indicated in Fig. 4. At one end of the shaft 98 is a transverse finger 100 engageable in slots 102 formed in an extension or hub-like element 104 on the side plate 20. A grip element 106 may be provided in the extended end of the shaft for grasping by the hand and rotating the shaft to different positions for adjusting the tension of the spring. When it is adjusted to the desired tension, the shaft is released, and through the action of a compression spring 108 reacting between the side plate 20 and a collar 110 on the shaft, the shaft moves in the opposite direction for moving the pin 100 into the slot 102.

The support for the upper belt 80 is similar to the lower belt except that it is stationarily mounted and it is positioned in association with the lower run of the belt. Stiffeners 112 are provided similar to the stiffeners 86 and have rollers 114 in their extended ends. These stiffeners are mounted in place by means of a transverse member 116 which may be in the form of a board or plate, mounted on the side plates of the machine. The transverse member 116 is mounted rigidly in location as are, consequently, the stiffeners 112.

The tying device 84 is of a known type, and includes an upstanding arm 118 receiving a tying string 120. This arm is disposed between the axially spaced elements of the belts 80 and 82, as shown most clearly in Fig. 2, and has free movement in response to the nature of its operation, in a plane transverse to the axes of the rolls 28 and 30. The details of this tying machine need not be entered into, but suffice it to say that in response to the folded paper emerging from between the belts 80 and 82, as will be explained more fully hereinbelow, the folded paper engages the tying string 120 and the arm 118 recedes from its position of Fig. 1. This operation in cooperation with other elements of the tying device 84 effects tying of the paper. The paper is passed over the end of the lower belt 82 and discharged onto a chute 122 from which it slides to the exterior of the machine.

The newspapers to be folded are placed in a hopper 124 adjacent the top of the machine, which consists of a pair of spaced side plates 126 and a bottom element 128. The newspapers are indicated at 130 (Fig. 6) and are arranged or placed in the hopper in vertical, transverse position. The newspaper usually is in the form delivered by the printer, namely, a large size paper is folded once, while the tabloid form is not folded. The bottom element 128 of the hopper is of special construction for facilitating the movement of the papers into the machine. The bottom element 128 is inclined, as will be noted, and includes a plurality of rolls 132 extending transversely and positioned closely together throughout the length of the bottom element. These rolls are suitably mounted in the hopper in the side plates thereof or other constructional elements thereof. Belt means 134 is mounted on the rollers in surrounding relation to all of the rollers, whereby the upper run of the belt spans all of the rollers and provides continuous and unbroken supporting means for the papers in their movement down the hopper. Preferably the belt means 134 is composed of a pair of axially spaced belt elements.

The papers in the hopper are urged downwardly into the machine by means of a paper follower, indicated in its entirety at 136, which includes an upper slide 138 and a paper engaging element 140. The slide 138 is slidably mounted in grooves 142 (Fig. 2) formed in a top plate or cover means 144 of the machine, which preferably is inclined in position parallel with the bottom element 128 of the hopper. The element 140 is vertically slidable in a slot in the slide 138. The element 140 is provided with a hand hold 148 adjacent the top for facilitating grasping and raising it. The user in utilizing the follower may first insert the papers in the hopper and thereafter raise the front element 140 upwardly in the slide 138 to clear the papers. He then pulls it to the left (Fig. 1) drawing the slide 138 upwardly in the grooves 142 to its extended position shown in Fig. 6 and then releases the element 140 and forces it downwardly in position in following relation to the papers. The slide 138 is urged downwardly by suitable biasing means which may take the form of a weight 150 secured to a string 152 and trained over a pulley 154 suitably mounted on the machine as on a bracket 156. Other means, such as a spring, may be utilized for biasing the slide 138 downwardly, if desired. In response to this downward biasing movement, the element 140 performs a following function on the papers in the hopper, i.e., it urges the papers downwardly into the machine in response to the papers at the lower end of the stack being fed into and through the machine. The element 140 retains the papers upright, and the connection between the element 140 and slide 138 is such as to retain the element 140 in the desired vertical position.

The papers in the hopper ride down on the belt means 134 in response to gravity, and the action of the follower 136. At the lower end they engage one or more of a plurality of transverse rods 158 suitably mounted in the machine, as in the side plates 20. The papers so rest against these rods at their upper portion, but at their bottom edges after leaving the belt means 134 they move onto an assemblage 160 which includes a plurality of elements, all of which will be described in detail hereinbelow, and act as a means for singly removing the papers from the lower end of the stack, and otherwise controlling their movements. This assemblage is operative in connection with a feeding means indicated in its entirety at 162, and includes a transverse bar 164 riding in slots 166 in the side plates 20. These slots are similarly shaped, being symmetrical counterparts, and each includes a lower vertical portion 168 and an upper horizontal portion 170. The transverse bar or rod 164 is controlled by a pair of connecting rods 172 suitably mounted at one end of the respective end of the transverse rod 164 and at the other end on a cam disc 174. The discs 174 are mounted, as will be noted in Fig. 2, one on each side of the machine. In response to rotation of the discs, the connecting rods raise and lower the transverse bar 164 in the slots 166 in the paper feeding operation.

The discs 174 are rotated through the medium of a belt 176 (Fig. 8) mounted on the shaft of the drive roll 28 through which the drive is imparted from the motor 50 to the machine. The roll 28, as was explained above, is stationarily located and is not permitted transverse movement as are the remaining rolls R.

Secured to or mounted on the discs 174 for rotation therewith are one or more cams or eccentrics 178 which engage a swinging lever or arm 180 pivotally mounted at one end at 182 in a suitable element of the machine, and having at its other end a pivotal connection at 184 with the lower end of a plunger 186 (see Figs. 1, 7, and 7a) mounted for vertical sliding movement in a block 188. The plunger 186 is rounded, or nearly pointed, at its upper end for ease in entering between the papers, as described below. The plunger 186 is disposed adjacent a similar plunger 190 also mounted in the block 188 for vertical sliding movement. However the plunger 190 is biased upwardly constantly by a compression spring 192. The upper edges of these two plungers 186 and 190 act to control the lower edges of the papers in the stack in the hopper, so acting in conjunction with the transverse bar 164 and a stop element 194 extending upwardly from the block 188 at a position forwardly of the plunger 190.

Attention is directed to Figs. 7 and 7a indicating the action in thus controlling the newspapers 130, several of which are shown, others being at the lower end of a stack in the hopper. Certain of them are shown resting on the belt means 134 and with the lower edge of the lowermost paper engaging the upper edge portion of the plunger 186 (Fig. 7). The plunger 186, as will be understood, is raised and lowered pursuant to the rotation of the cam or eccentric 178. Fig. 7 shows the plunger 190 in raised position in which it restrains movement of the newspapers while the plunger 186 is in lowered position. The newspaper at the lower end of the stack is thus substantially directly above the plunger 186.

Upon lowering movement of the feeding arm 164, the latter engages the plunger 190 and lowers it, and at a synchronized movement relative thereto, the plunger 186 raises and in doing so enters behind the lower edge of the newspaper individually designated 130a in Fig. 7a, i.e., enters between that newspaper and the one next to it, and moves the lower edge portion thereof forwardly to the position indicated at 130b. This action moves the lower edge of the newspaper onto the upper surface of the feeding rod 164, which is rounded, and it easily slides forwardly to the position mentioned (130c) and then extends downwardly into engagement with the stop 194. If, however, the plunger 186 would not enter behind the first paper, it may engage the lower edge thereof, and in that case the portion at 130b would bow outwardly and in that way force the lower edge into the recess 195. This one newspaper then (130a) or at least the lower edge portion thereof, is disposed forwardly of the transverse feeding bar 164 and is segregated therefore from the stack from which it was moved. The upward movement of the plunger 186, in moving the lowermost newspaper as described, is then in position to again be engaged by the then lowermost newspaper in the stack and restrain the latter from moving downwardly in the hopper.

Upon upward movement of the transverse feeding bar 164 pursuant to the above described movements and operation, the lowermost newspaper is fed into the interior of the machine, and particularly into the folding rolls R.

The upward movement of the transverse bar 164 pursuant to rotation of the discs 174 is controlled by the lower vertical segment 168 of the slot, and as it continues to raise it is guided by the portion 170 of the slot into a horizontal movement. The bar at this portion of its movement is adjacent the upper portion of the vertically arranged newspaper and it moves between the upper two and lower two stop rods 158 and produces a fold in the newspaper. Such a fold is indicated in Fig. 11. Figs. 10 to 16 show various steps in the folding operation of the newspaper, and it is pointed out that the newspaper in these figures, for the sake of convenience, is indicated by a single line. Fig. 10 shows the newspaper 130 in straight vertical position. In Fig. 11 the newspaper is shown with a first fold therein. The fold is produced as explained above by the feeding bar 164 moving horizontally in the portion 170 of the slot. The bar is permitted sufficient movement to bring the folded or leading edge of the newspaper into engagement with the top pair of the rolls R, namely, 22 and 24. Upon these rolls gripping the paper, the latter is fed between the rolls and the leading edge moves into the recess 64 in the folding finger 54, as indicated in Fig. 11. Continued movement of the newspaper by the rolls 22 and 24 forces or jams the newspaper into the folding finger, and because of the location of the axis of the folding finger 54 relative to the plane 76, as explained above, this forcing or jamming action of the newspaper forces the folding finger to move from its normal position to its discharging position shown in Fig. 12. In this movement, the forked element 62 adjacent the roll 24 maintains the newspaper in effective engagement with the roll 24 and as the folding finger then moves to its discharging position, the newspaper is disposed effectively between the second set of rolls which is constituted by the rolls 24 and 26.

For the sake of convenience, the newspaper 130 in these diagrammatic figures, will also be designated specifically by the folds being formed therein. The first fold formed by the feeding bar 164 includes the portions or laps 130d and 130e. The movement of the folding finger 54 from its normal position to its discharging position forms a second fold, the fold thus formed including in addition to the portions 130d and 130e, the fold 130f. The rolls 24 and 26 then continue feeding the folded newspaper therethrough and the new leading edge, pursuant to the newspaper issuing from these rolls, engages the succeeding roll 28. The direction of rotation of this roll, as indicated by the arrow, then moves the leading edge to the right, Fig. 1, and it is then gripped between the new set of rolls 26 and 28. These two rolls then continue feeding the newspaper therebetween and force it into the recess in the folding finger 56. The action of this folding finger is precisely the same as that described above in connection with the finger 54, being similarly located relative to the plane 78, and the finger is then rotated from its normal position of Fig. 14 to the discharging position of Fig. 15. This movement of the finger produces a third fold, the fold including a fourth portion or lap 130g. The rotation or rocking movement of the finger 56 maintains the paper in effective engagement with the roll 28. The folded paper is then carried by the roll 28 into engagement also with the roll 30 and consequently gripped between these two rolls and fed therefrom between the belts 80 and 82. The paper thus folded is conveyed by these belts to the tying machine as represented by the arm 118 and string 120 for the tying operation referred to above. The paper is folded and tied in a small compact bundle of the nature usually utilized by delivery boys.

The folding operation is extremely rapid. The machine is unusually simple, and rugged. The requirement for precision parts is obviated. The folding fingers 54 and 56 effect folding operations, together with the rolls, that is sure and accurate, due to the positioning of the axes of these fingers relative to the rolls.

It will be understood that the spacing between the rolls of the respective pairs is varied according to the thickness of the folded newspaper at the respective locations. For example, the spacing between the rolls 22 and 24 is less than that between the rolls 24 and 26 and similarly the spacing of the latter is less than the spacing between the rolls 28 and 30. The recess 64 or the space between the forked elements of the finger 56 may be greater than that of the finger 54 to accommodate the greater thickness of the newspaper due to the greater number of folds.

While I have shown and described herein a preferred form of the invention, it will be understood that changes may be made within the scope of the appended claims.

I claim:

1. A machine of the character disclosed comprising a plurality of sets of rolls arranged serially, the rolls being of substantially the same diameter and extending substantially entirely across the machine, each set of rolls being operative for gripping a paper and passing it therethrough, means for feeding a paper to a first of the sets, each set of rolls establishing a plane in which a paper is disposed in passing through these rolls, and the sets being arranged so that the said planes associated with adjacent sets are disposed at an angle relative to each other, a finger pivoted on an axis on the side of the plane associated with said first set opposite the second set, and having a recess at its swinging end, said finger being mounted for pivotal movement between a first position in which the recess is directed toward the exit bight of the rolls of the first of said sets and a second position in which the recess is directed toward the receiving bight of the rolls of a second of said sets, the finger when in said first position being adjacent to but angularly displaced from the plane associated with said first set and thereby being rocked under the force of a paper from the first set entering its recess to its second position in which the finger is closely adjacent the plane associated with said second set, the finger being operative for producing a fold in the paper and presenting a folded new leading edge to the second set of rolls, and means biasing the finger to its first position and yielding under the action of the finger moving to its second position.

2. A machine of the character disclosed comprising a plurality of sets of rolls arranged in serial order and operative for gripping a paper between rolls of a set and passing it along from a first set to the next, means for feeding a paper to the first set, and deflecting means between the first and said next set including pivoted finger means having a forked portion at a receiving end and a pivot point spaced from the forked portion in direction longitudinally of the finger, the finger being normally directed toward the first set of rolls, the finger means being positioned in its said normal position for receiving the leading edge of a paper issuing from the first set of rolls and in response to pressure exerted thereon by the paper rocking toward the next set thereby forming a fold in the paper and forming a new leading edge therein which is disposed adjacent the rolls of the next set for gripping thereby and passing therethrough, and means biasing the finger to its normal position and yielding under the rocking action of the finger, the finger when in its normal position being closely adjacent to but angularly displaced from the plane of the paper passing through the first set and when locked being closely adjacent the plane of a paper passing through the next set.

3. A machine of the character disclosed comprising a plurality of sets of rolls each including a main surface of resilient material and grooves set in from said surface, means for feeding a paper to a first of said sets, forked fingers between the first set and a succeeding set, the fingers being pivotally mounted for movement between a first position with the forked end directed to the space between the rolls of the first set and a second position directed to the space between the rolls of the second set, the elements making up the forked portions being of a thickness substantially equivalent to the depth of the grooves and extending substantially into the corresponding grooves when in at least the first position whereby to form substantially continuous surfaces between said main surface of the rolls and the inner surfaces of the said elements of the fingers, said fingers being normally disposed in said first position and disposed to receive the leading edge of a paper issuing from the first set of rolls, and being so disposed relative to the line of movement of the paper as to be deflected by the force of the paper to its said second position, thereby forming a fold, and forming a new leading edge and presenting the latter to the rolls of the second set.

4. A folding machine comprising means for folding a paper including a plurality of pairs of rolls in series which grip the paper therebetween and pass the paper from one roll to the next, and means for delivering a folded paper from the last of the pairs in a predetermined direction including an endless belt trained over each roll, means supporting the extended ends of the belts with adjacent runs of the belts extending generally in the same direction and defining therebetween an elongated path extending generally perpendicular to the axes of the rolls, the extended ends of the belts being relatively movable toward and from each other, and means yieldingly biasing said extended ends relatively toward each other.

5. The invention set out in claim 3 in which the grooves are adjacent to but spaced inwardly from the ends of the rolls, and the remaining portions of each roll are of substantially uniform diameter.

6. The invention set out in claim 1 in which the rolls are of substantially uniform diameter the greater part of their length.

References Cited in the file of this patent

UNITED STATES PATENTS

| | | |
|---|---|---|
| 772,474 | Owens | Oct. 18, 1904 |
| 1,530,209 | Scheuner | Mar. 17, 1925 |
| 2,101,328 | Broadmeyer | Dec. 7, 1937 |
| 2,143,714 | Rosebush | Jan. 10, 1939 |
| 2,191,586 | Richard | Feb. 27, 1940 |